United States Patent
Chao et al.

(10) Patent No.: US 10,503,720 B2
(45) Date of Patent: Dec. 10, 2019

(54) PROVIDING EVENTUAL CONSISTENCY FOR MULTI-SHARD TRANSACTIONS

(71) Applicant: Facebook, Inc., Menlo Park, CA (US)

(72) Inventors: Neil Earnest Chao, Fremont, CA (US); Daniel Nota Peek, Sunnyvale, CA (US); Dmitri Perelman, Sunnyvale, CA (US); Philippe Vincent Ajoux, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 319 days.

(21) Appl. No.: 15/434,347

(22) Filed: Feb. 16, 2017

(65) Prior Publication Data

US 2017/0161310 A1    Jun. 8, 2017

Related U.S. Application Data

(63) Continuation of application No. 14/268,888, filed on May 2, 2014, now Pat. No. 9,613,122.

(51) Int. Cl.
| | |
|---|---|
| *G06F 15/16* | (2006.01) |
| *G06F 16/23* | (2019.01) |
| *G06F 16/27* | (2019.01) |
| *G06F 16/18* | (2019.01) |

(52) U.S. Cl.
CPC ...... *G06F 16/2336* (2019.01); *G06F 16/2365* (2019.01); *G06F 16/278* (2019.01); *G06F 16/1865* (2019.01)

(58) Field of Classification Search
None
See application file for complete search history.

(56) References Cited

U.S. PATENT DOCUMENTS

| | | |
|---|---|---|
| 2011/0041006 A1 | 2/2011 | Fowler et al. |
| 2011/0078385 A1 | 3/2011 | Lev et al. |
| 2013/0086227 A1 | 4/2013 | Takao et al. |
| 2014/0012814 A1 | 1/2014 | Bercovici et al. |

(Continued)

OTHER PUBLICATIONS

U.S. Appl. No. 14/268,888 by Chao, N.E., et al., filed May 2, 2014.

(Continued)

*Primary Examiner* — Alex Gofman
(74) *Attorney, Agent, or Firm* — FisherBroyles, LLP

(57) ABSTRACT

A multi-shard database system receives a transaction including multiple actions directed to different shards of the database system. The database system creates a transaction record including a transaction identifier and a transaction status for the transaction in a transaction database. The database system then executes, in parallel, the multiple actions on the different shards by associating with each data item involved in the transaction a data structure that includes the transaction identifier and new data to be applied to the data item. The database system then updates the transaction status in the transaction record for the transaction from pending to completed when each of the multiple actions is successfully executed on the corresponding shard. Consistency is eventually implemented when the data structures associated with the data items involved in the transaction are evaluated. The evaluation of a data structure can be triggered by a read request or other events.

20 Claims, 11 Drawing Sheets

(56) References Cited

U.S. PATENT DOCUMENTS

2014/0108421 A1* 4/2014 Isaacson ............. G06F 16/2255
707/747
2014/0149794 A1   5/2014 Shetty et al.
2015/0317349 A1  11/2015 Chao et al.

OTHER PUBLICATIONS

Final Office Action dated Oct. 12, 2016 of U.S. Appl. No. 14/268,888 by Chao, N.E., et al., filed May 2, 2014.
Non-Final Office Action dated May 19, 2016 of U.S. Appl. No. 14/268,888 by Chao, N.E., et al., filed May 2, 2014.
Notice of Allowance dated Dec. 20, 2016 of U.S. Appl. No. 14/268,888 by Chao, N.E., et al., filed May 2, 2014.

* cited by examiner

US 10,503,720 B2

PROVIDING EVENTUAL CONSISTENCY FOR MULTI-SHARD TRANSACTIONS

CROSS-REFERENCE TO RELATED APPLICATIONS

This application is a continuation of U.S. patent application Ser. No. 14/268,888, entitled "PROVIDING EVENTUAL CONSISTENCY FOR MULTI-SHARD TRANSACTIONS," filed on May 2, 2014, which is incorporated herein by reference in its entirety.

BACKGROUND

A database is an ordered collection of data on which read/write operations can be performed. A database system that handles large volumes of data is generally not confined to a single computing device or even a single data center. Instead, a large database system is typically divided into shards, some of which may be located in one computing device or data center and others in another computing device or data center.

In a database system, some properties, e.g., consistency, concurrency, atomicity and durability are generally desired. Consistency ensures that one client (e.g., person or computing device) accessing data has the same view of the data as another client accessing the same data at approximately the same time. Concurrency ensures that multiple clients can access the database system at the same time to read/write data. Atomicity ensures that a transaction succeeds only when all actions of the transaction succeed, preventing a partial-state scenario in which some actions succeed while others fail. Durability ensures that changes to the database persist once the transaction is committed. These properties are difficult to guarantee in a database system that has data stored in different shards.

One way existing systems implement consistency on a database system that has data stored in different shards is by using a locking mechanism. The locking mechanism acquires locks on the database rows across the different computing devices in order to perform writes on data corresponding to those database rows. Any subsequent read on those database rows can occur only after the locks have been released, increasing the latency for those subsequent read transactions. Thus, the locking mechanism for implementing consistency involves a tradeoff between consistency and latency for read transactions.

Some database systems utilize write-ahead logs ("WAL") to provide atomicity and durability. Such database systems log each action on the WAL and execute them serially. For example, the database system would write the first action (updating A to A') to the WAL and then perform the action, followed by the second action and finally the third action in a serial fashion. If the third action fails, the database system can recover by replaying actions from the WAL. Using a WAL, however, has issues. For example, read requests must consult the WAL before the database system. Moreover, efficiently distributing a WAL is also non-trivial.

DETAILED DESCRIPTION

Figure 1:
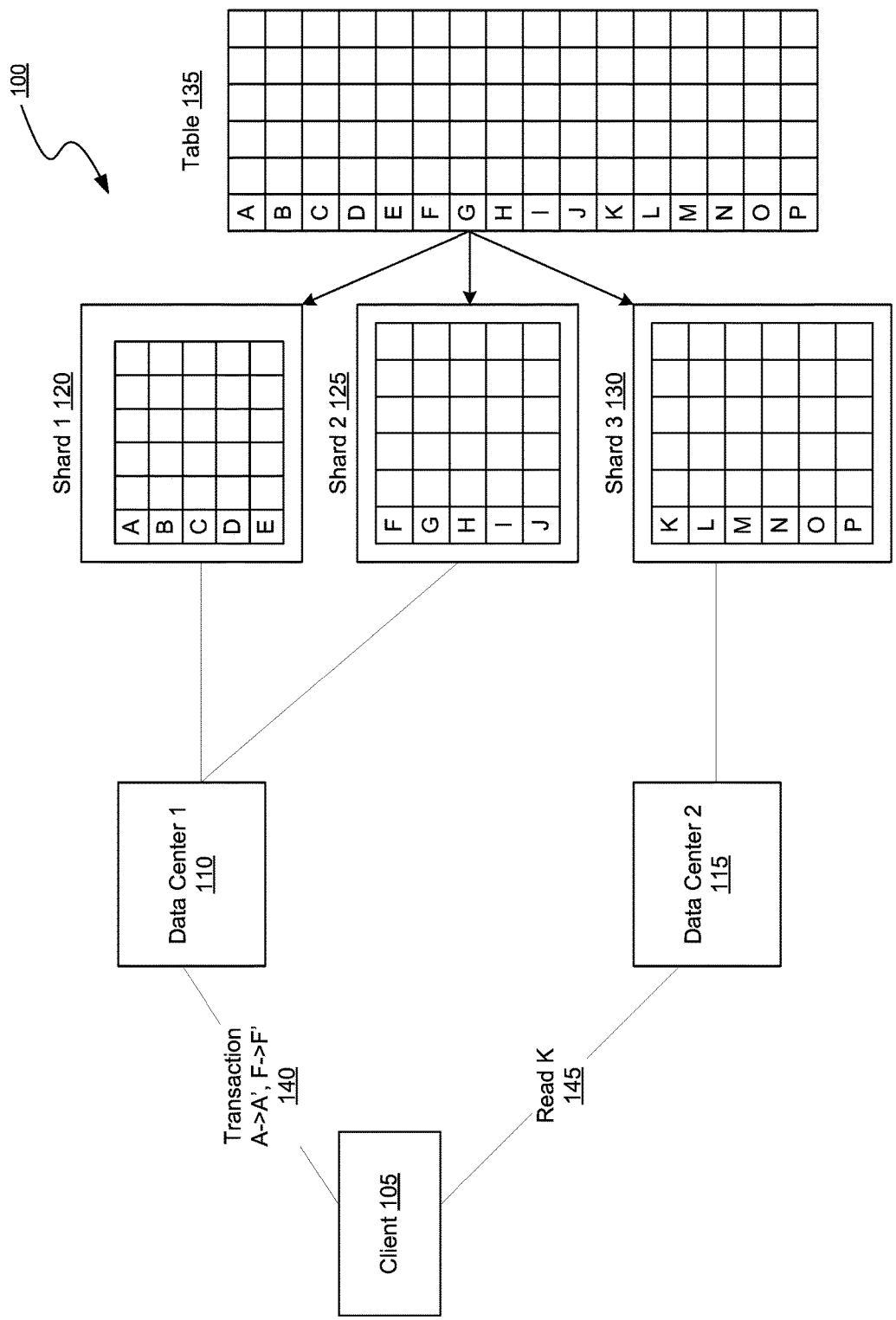
FIG. 1 is a block diagram illustrating an example of a multi-shard database environment.

The present disclosure is related to providing eventual consistency for a multi-shard transaction. In some embodiments, a database system comprising multiple database shards (or simply "shards") utilizes a multi-shard commit protocol to implement eventual consistency. In accordance with the multi-shard commit protocol, multiple actions that are a part of a single transaction spanning multiple shards are triggered in parallel. In some embodiments, for each multi-shard transaction, a new transaction record is created in a transaction database with a transaction identifier and an initial status of "pending." The transaction status for a transaction can be atomically updated from the initial status of pending to completed (or committed) only when all the multiple actions succeed. If even one of the multiple actions fails, the transaction cannot be committed. If all of the multiple actions do not succeed, a failed response may be returned. The failed response can update the transaction status from pending to failed. In some instances when no response is received within an allotted time, the transaction status can be atomically updated from pending to failed. In either case, the transaction status is atomically updated from pending to failed.

According to some embodiments of the multi-shard commit protocol, success of a transaction is checked not at write, but on read by looking up the status of the transaction from the transaction database. For example, if a data item was involved in a transaction, the data item is associated with a "pending slot," which is a data structure that includes information that can be used to identify the transaction and retrieve the status of the transaction, and a new state of the data item. When a subsequent read request to read the data item is received from a client (e.g., person or computing device), the pending slot corresponding to the data item is evaluated to determine whether the old state or the new state of the data item should be read. For example, if the transaction status is completed (e.g., all the actions of the transaction on multiple shards were completed successfully), the data item is updated from the old state to the new state, and the old state is discarded. Similarly, if the transaction status is failed (e.g., at least one of the actions of the transaction failed), the new state is discarded, and the old state is read. If the transaction status is pending, the old state is read and the new state remains in the pending slot.

In this manner, the multi-shard commit protocol guarantees that if one action of a multi-shard transaction is committed, other actions of the multi-shard transaction will eventually be committed as well. For example, if a multi-shard transaction updates data item A to A', B to B' and C to C', where data items A, B and C are on different shards, the multi-shard commit protocol guarantees that if a read on any of the data items returns the new state (e.g., A'), a read on the other data items will also return the new states of those data items (e.g., B' or C'). The multi-shard commit protocol also guarantees that once the new state of any of the data items has been accessed (e.g., A'), there will be no rewinding back to the old state (e.g., A).

In some embodiments, the success of a transaction can also be checked on write, instead of read in order to free up the pending slot. In some embodiments, instead of eventual consistency occurring on read as described above, eventual consistency can occur sometime after the write. For example, when load on the database servers is low, the pending slot for data items involved in transactions can be evaluated and a decision to update to a new state or retain the old state can be made before a read occurs.

The multi-shard database system implementing the multi-shard commit protocol provides eventual consistency for multi-shard transactions without any of the disadvantages of the existing systems. For example, the multi-shard commit protocol does not need to acquire locks on all data items across different shards that are involved in the transaction to provide consistency. Acquiring locks on all data items can significantly slow down reads of those data items because the read cannot be processed until the locks have been released. Instead, the multi-shard database system allows reads of data items that have pending writes to occur without delay. In a multi-shard database system that experiences significant read traffic, implementation of the multi-shard commit protocol can significantly reduce the latency in handling read traffic, which can improve user experience.

Similarly, acquiring locks on all data items involved in a transaction also slows down the write process and unnecessarily complicates the clean up or rollback should any of the actions of the transaction fail. For example, consider a transaction comprising 10 actions directed to different shards. Existing systems would write actions 1, 2, 3 and so on serially, while all the data items remain under the lock. If, for example, action 8 fails, the existing systems would undo or rollback the write for actions 7, 6, 5, and so on serially. The process of serial writes and rollbacks can thus slow down the database system, and prevent other writes or reads on the data items from being processed. In the multi-shard database system disclosed herein, the multi-shard commit protocol triggers all the actions (e.g., 1-10) of a transaction in parallel. This parallel execution of the actions reduces latency in write transactions. While the data items involved in a transaction may not be modified by another transaction until the first one commits or fails, the multi-shard commit protocol employs timeouts and/or retry mechanisms to resolve the transaction status faster. In some embodiments, even when a transaction involving a data item is pending, the multi-shard commit protocol can allow an unrelated non-transactional write on the data item to occur, asynchronously, so that the later arrived non-transactional write does not have to wait for the pending transaction to be resolved.

Figure 8:
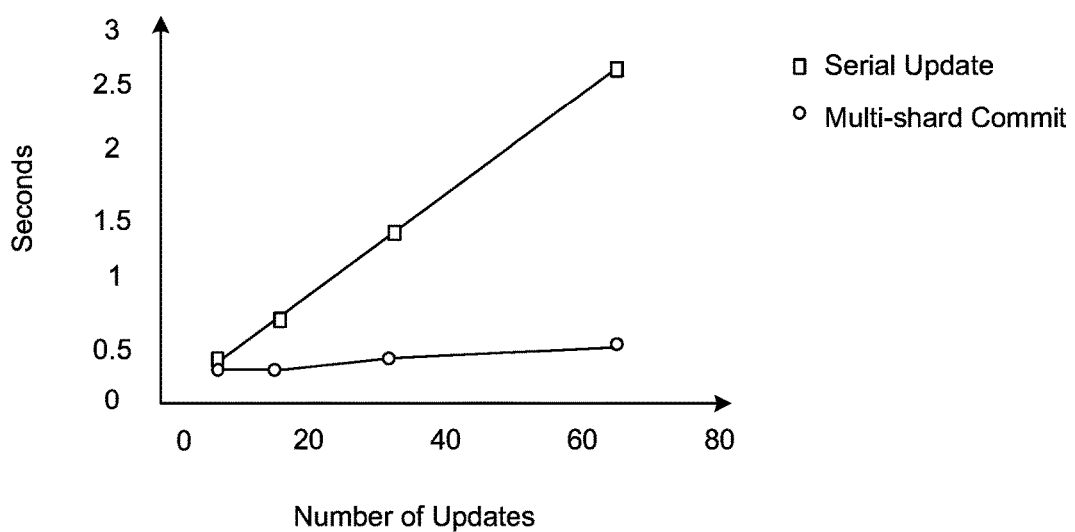
FIG. 8 is a graphical chart illustrating the reduction in latency in processing multi-shard transactions based on the multi-shard commit protocol compared to serial update.

The reduction in latency in processing multi-shard transactions through the use of the multi-shard commit is illustrated by the example chart of FIG. 8. The chart shows that latency for serial execution of actions (or updates) increases linearly with the number of actions per transaction. In contrast, with the multi-shard commit protocol, the latency increases at a slower rate and plateaus at a level that is orders of magnitude lower than for the serial execution case.

Various implementations of the disclosed multi-shard database system implementing the multi-shard commit protocol and methods for providing eventual consistency will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods.

As used herein, a transaction is a logical unit of database work comprising a set of write actions directed to multiple shards of the multi-shard database system. As used herein, an action is an operation, request or task, and can be of write or read variety. A transaction, write transaction and multi-shard transaction are used interchangeably throughout this disclosure. Transactions are triggered using Structured Query Language (SQL) or other Data Manipulation Languages (DML) commands. For example, an insert, delete or update command can be used to perform a write operation on a data item stored on a shard to update the data item from an old state to a new state.

As used herein, a non-transactional write or a regular write transaction is a write action that is not a part of a transaction. A transactional write, as used herein, is a write action that is a part of a transaction.

As used herein, a read request is made using a command (e.g., SELECT statement in MySQL) to access a data item stored on the multi-shard database system.

FIG. 1 illustrates an example multi-shard database environment 100. An example database table 135 having rows A-P is divided into three shards, shard 1 (120) having rows A-E, shard 2 (125) having rows F-J and shard 3 (130) having rows K-P. In this example, shards 1 and 2 are located in data center 1 (110), while shard 3 is located in data center 2 (115). It should be noted that the example of FIG. 1 is for illustration only, and is not limiting. A database table may be sharded into any number of shards depending on the amount of data (e.g., for scaling) or other reasons. Similarly, all shards need not be co-located in the same data center. The multi-shard database system may have data stored in more than two data centers, which may be in the same region or different regions. It should be noted that while FIG. 1 illustrates the database table 135 being sharded using a horizontal sharding scheme, any other sharding schemes may be used to manually or automatically shard the database table.

One or more shards (e.g., 120, 125) can be located on a database server. Thus, a multi-shard database system includes a storage layer comprising a plurality of database servers, each server being responsible for one or more shards. For example, a database server performs the actual read/write operations on data items stored on the shards that it is responsible for when instructed. The database server can be a MySQL database server in some embodiments. Alternately, the database server can be a Hadoop HBase, NoSQL or other alternative database systems.

The client 105 communicates with the plurality of database servers over a network, either directly or via one or more intermediary layers (e.g., a caching layer). As used herein, a client (e.g., client 105) refers generally to a computer, program, other device, user and/or combination thereof that is capable of processing and making requests and obtaining and processing any responses from servers across a network. As used herein, a "server" refers generally to a computer, other device, program, or combination thereof that processes and responds to the requests from the requesting clients across a network. Networks can include Local Area Networks (LANs), Pico networks, Wide Area Networks (WANs), Wireless Networks (WLANs), or other wired networks. The Internet is for example a network to which remote clients and servers are connected to and enable the clients and servers to access and interoperate with one another.

In FIG. 1, a transaction 140 from the client 105 to update row A to A' and row G to G' is routed to data center 1 to which shard 1 containing row "A" is assigned and data center 2 to which shard 2 containing row "G" is assigned, respectively. Similarly, a read request to read row k is routed to data center 2 to which shard 3 is assigned.

Figure 2A:
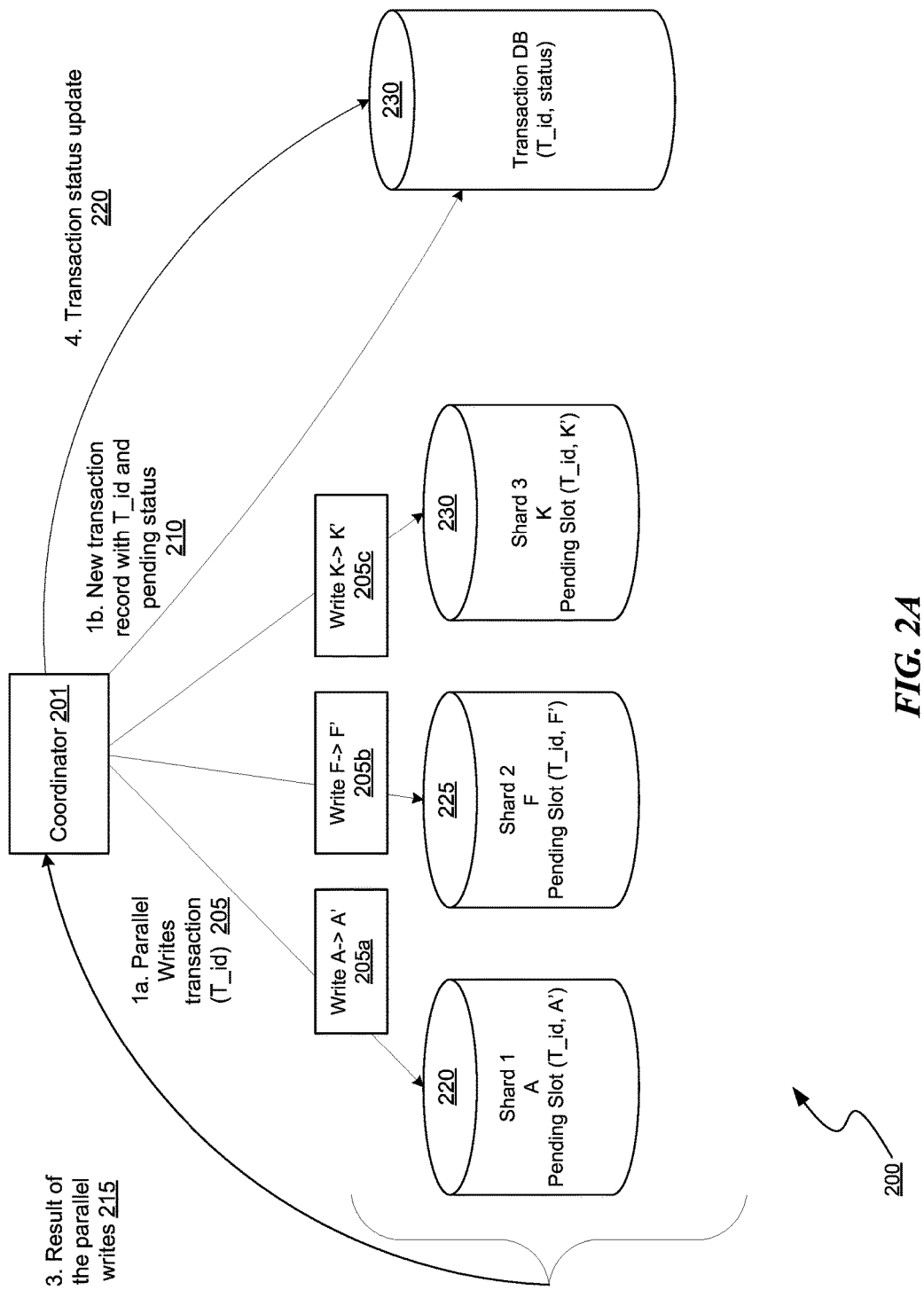
FIG. 2A is a data flow diagram illustrating execution of an example write transaction in a multi-shard database system.

FIG. 2A is a data flow diagram illustrating processing of an example transaction comprising multiple actions directed to multiple shards in the multi-shard database system.

A coordinator 201 receives a multi-shard transaction that involves multiple actions spanning shards 1, 2 and 3. The coordinator 201 can be a process running on the client (e.g., client 105) or another computing system. The coordinator 201 assigns a transaction identifier (T_id) to the transaction and triggers parallel write actions 205 on data items stored in the shards. The coordinator 201 also requests creation of a transaction record 210 that includes as fields, the T_id and a pending state in the transaction status database 230.

The write action 205a can be a write operation to update data item A to data item A' and the write operation occurs on shard 1 where the data item A is stored. Similarly, the write action 205b is directed to shard 2 to update data item F to F'. Similarly, the action 205c is directed to shard 3 and a pending slot is attached to data item K.

If the transaction is successfully written, the coordinator 201 receives an indication 215 of such and sends an update 220 to the transaction database 230 to change the transaction status from pending to committed (process 220). If the coordinator 210 receives an indication of failed transaction, the transaction status for the transaction is updated from pending to failed. If the coordinator 210 receives no indication at all, the transaction may have failed or may still be pending. The coordinator 210 can retry and/or after an allotted amount of time if there still no response, the coordinator 210 can change the status of the transaction from pending to failed.

An example pseudo code that the coordinator 201 can execute to trigger the parallel writes to data items in different shards and update the transaction status to completed (or committed) or failed, based on the success or failure of the parallel writes is provided below.

```
try {
    results = PARALLEL(
        rpc_stage_write(object, write),
        rpc_stage_transaction(record)
    ) ;
} catch (const IOException& e) {
// Timeouts, connections errors, etc., may cause I/O exception
    PARALLEL(
        rpc_set_transaction_status(tid, FAILED),
        rpc_fail_write(object, tid)
    );
    return false;
}
if (!results.allTrue( )) {
    PARALLEL(
        rpc_set_transaction_status(tid, FAILED),
        rpc_fail_write(object, tid)
    ) ;
    return false;
}
```

When the coordinator 201 receives an indication that the parallel writes 205 were successful, the coordinator 201 commits the transaction by updating the transaction status from pending to committed. An example pseudo code below shows the updating of the transaction status to committed.

```
try {
SYNC(rpc_set_transaction_status(tid, COMMITTED))
} catch (const IOException& e) {
// Explicitly fail the commit instead of waiting for timeout
ASYNC(rpc_set_transaction_status(tid, FAILED));
return false;
}
// Asynchronously launch the cleanup/resolution phase to improve
performance. But it need not complete immediately or at all for
correctness. This can be done on read, or when the server load is
low.
ASYNC(rpc_commit_write(object, tid));
return true;
}
```

When the write operation to update data item A to A' is triggered in shard 1, the database server hosting the shard checks if the data item A is already involved in a transaction. Any data item involved in a transaction has a pending slot attached or associated with it. If data item A is not involved in a transaction, because there is no pending slot associated with it, the database server creates or associates a pending slot to data item A. The pending slot data structure includes the transaction id of the transaction that the write operation is a part of and the update from the write operation. Once the pending slot is associated with the data item, the database server returns an indication that the write operation was successful (e.g., return a Boolean value true). An example data structure of the pending slot is provided below.

```
struct PendingWrite {
    UUID tid;
    Update update;
}
```

An example structure of a data item that has a pending slot is provided below.

```
struct Object {
    Data data;
    PendingWrite pending;
}
```

If the data item A already has a pending slot, the database server first evaluates the status of the pending slot by checking the transaction status of the transaction using the transaction id in the pending slot. If the status is pending, the write operation fails. If the status is failed, the write operation overwrites the data in the pending slot using the transaction id of the write operation and the update from the write operation. Finally, if the status is committed, the database server applies the update from the pending slot (i.e., from the previous write operation) and then overwrites the pending slot using the transaction id of the write operation and the update from the write operation. Whenever the write operation is successful, the database server returns an indication or response (e.g., Boolean value true) for the successful write operation. In the event that the write operation is not successful (e.g., pending slot could not be resolved), the database server returns an indication for the failed write operation The pseudo code below provides an example implementation of execution of a write operation that is a part of a transaction.

```
bool rpc_stage_write(Object obj, PendingWrite write) {
    LockGuard g(obj);
    // No pending commits, use empty pending slot.
    if (!obj.pending) {
        SYNC(obj.pending = write);
        return true;
    }
    try {
        // Resolve any already pending writes.
        Status status = SYNC(rpc_transaction_status(obj.pending.tid,
            obj.pending.timestamp));
        if (status == PENDING) {
            // Pending write, we must fail.
            return false;
        } else if (status == FAILED) {
            // Take over the pending slot.
            SYNC(obj.pending = write);
            return true;
        } else if (status == COMMITTED) {
            // Apply the committed write.
            SYNC(
                obj.applyPending( );
                obj.pending = write;
            );
            return true;
        }
    } catch (const IOException& e) {
        //The status of the previous commit is not known.
        return false;
    }
}
```

Figure 2B:
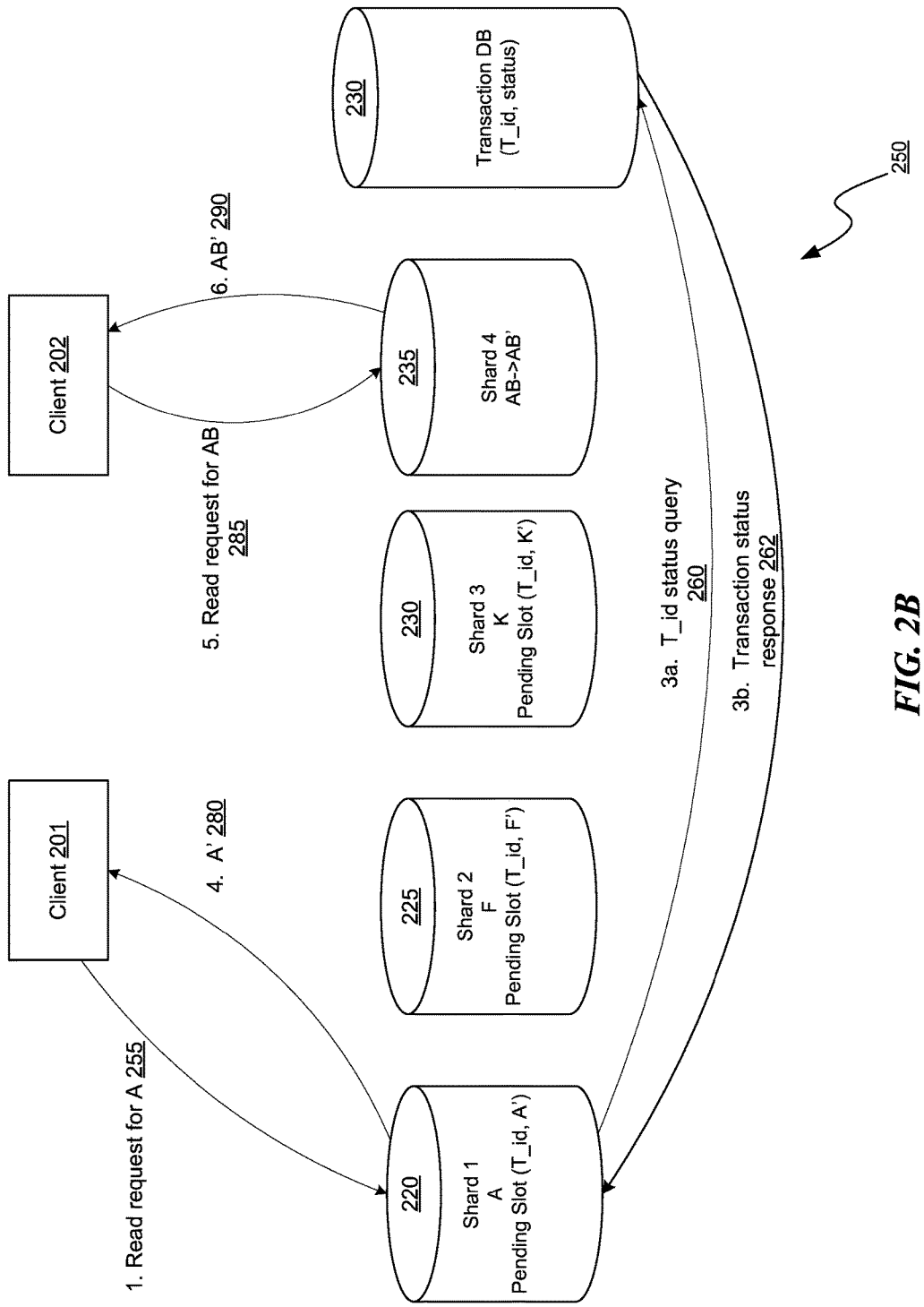
FIG. 2B is a data flow diagram illustrating processing of an example read transaction in the multi-shard database system.

FIG. 2B is a block diagram illustrating implementation of consistency on first read after the parallel write transaction of FIG. 2A.

As shown, a read request 255 to read data item A from a client 201 is routed to shard 1 of the multi-shard database system that contains the data item A. Assuming that the data item A has a pending slot that includes the transaction id of the last write operation and update (e.g., the new value A'), the database server sends a query 260 to the transaction status database 230 for transaction status 262 associated with the transaction id. Assuming that the transaction status 262 is committed, the database server applies the update in the pending slot to the data item A and deletes the pending slot. The database server then returns the data item A' as response 280 to the read request 255 for data item A.

If the transaction status 262 is failed, the database server deletes the pending slot, and returns the old value of the data item A as response 280. If the transaction is pending, the old value of data item A is returned without deleting the pending slot, because the pending slot may be resolved at a later time.

If the last transaction was a regular write transaction, the read does not incur a hit on the transaction database 230. For example, when the read request 285 for data object AB stored in shard 4 is received, the data object AB will have the new value AB' assuming that the regular write transaction was successfully completed and will not have a pending slot. In this case, the new value AB' is returned as response 290 without having to query the transaction database 230.

The pseudo code below provides an example implementation of execution of a read request.

```
Data rpc_read(Object obj) {
    LockGuard g(obj);
    // No pending commits.
    if (!obj.pending) {
        return obj.data;
    }
    try {
        UUID tid = obj.pending.tid;
        Status status = SYNC(rpc_transaction_status(tid,
            obj.pending.timestamp));
        if (status == FAILED) {
            // Asynchronously cleanup the pending write.
            ASYNC(rpc_fail_write(obj, tid));
            return obj.data;
        } else if (status == COMMITTED) {
            // Asynchronously apply the pending write.
            ASYNC(rpc_commit_write(obj, tid));
            return apply_update(obj.data, obj.pending.update);
        } else {
            // Write is pending, return old data.
            return obj.data;
        }
    } catch (const IOException& e) {
        // Status of transaction is unknown. Handle Exception
        return obj.data;
    }
}
```

In the event that there the status of the transaction cannot be resolved, the database server can take a measure to handle the exception and return a response to the read request. For example, the database server can delete the pending transaction and return the old value of the data item.

In some embodiments, a data item can be involved in a transaction that is pending when another write operation directed to the data item and unrelated to the transaction arrives. For example, a gifting transaction that involves multiple actions is triggered. One action of the transaction can be a gifter paying for a gift, second action can be applying the credit card to the gift and third action can be a giftee receiving the gift. Because these actions are a part of transaction, all the actions would need to happen at the same time, even if the actions happen after a lag. While the transaction is still pending, another action such as the gifter sending a message may arrive. In this example, both the transaction and the action involve the same user (i.e., the gifter). However, because the later arrived action is not a part of a transaction and is unrelated to the pending transaction, the order in which they are executed is less important. The database server can order the later arrived messaging action before the pending transaction and can thus execute the messaging action before the pending transaction is resolved.

By not having to wait for the pending transaction to be resolved in order for the non-transactional write to be executed, the multi-shard database system can reduce the latency in processing non-transactional write operations.

Figure 3A:
FIG. 3A is a schematic diagram illustrating timelines for actions included in the example write transaction of FIG. 2A.
Figure 3B:
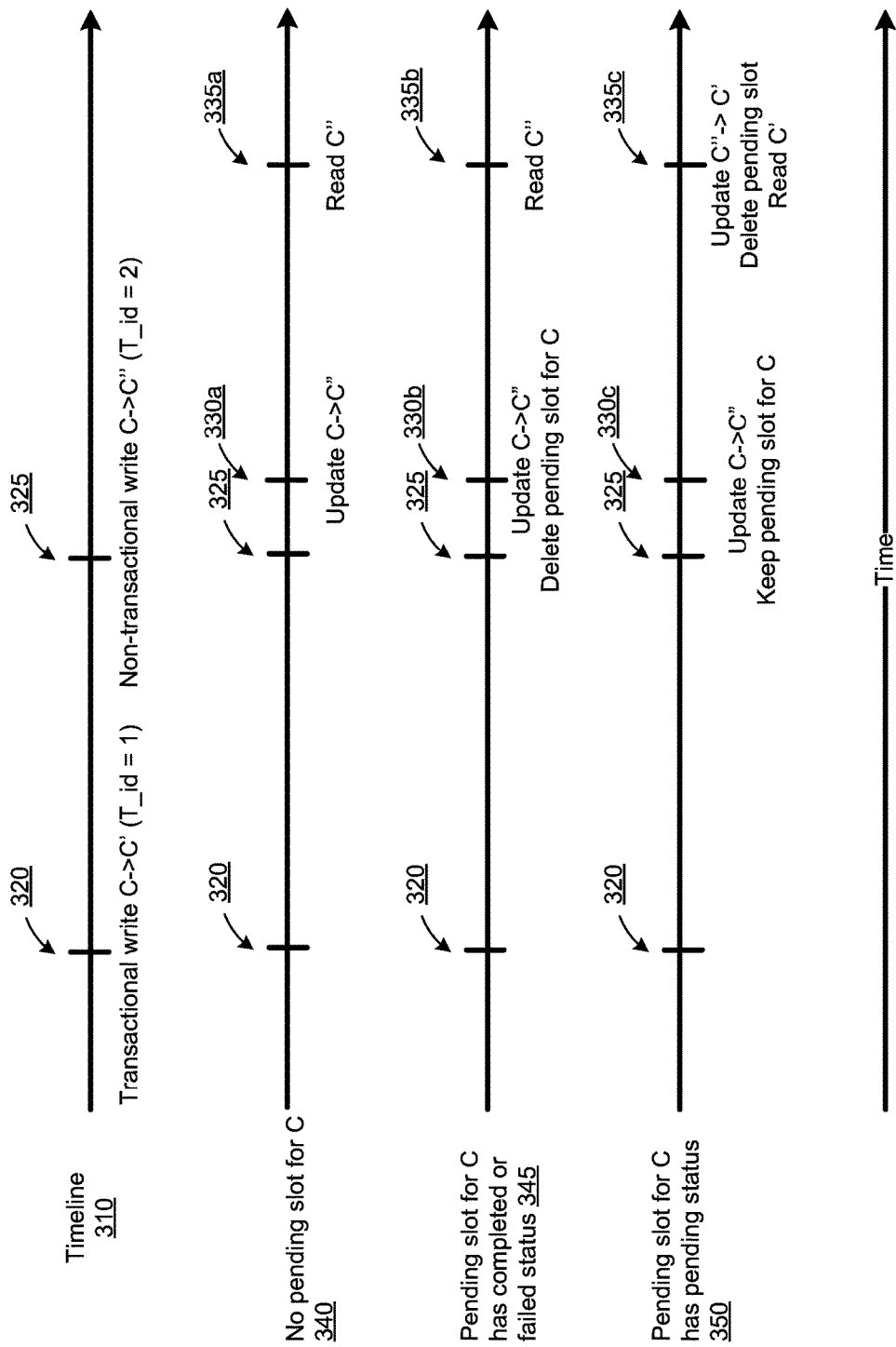
FIG. 3B is a schematic diagram illustrating timelines for the example write transaction of FIGS. 2A and 3A and a regular write transaction.

FIGS. 3A and 3B show various timelines for read/write operations to illustrate asynchronous execution of non-transactional write actions. It should be noted that these timelines are used herein to illustrate the logical order of execution of read/write operations. Events (identified by reference numerals) have been placed certain distance apart for clarity and such distances between events do not necessarily establish the length of time between the events.

A timeline 305 for the example write transaction of FIG. 2A is shown in FIG. 3A. As shown, each transactional write action occurring as part of the single transaction arrives together and is routed in parallel to the three shards. For example, a write action to update A to A' on shard 1 arrives at point 320 of timeline 305. Similarly, a transactional write action to update B to B' on shard 2 and a transactional write action to update C to C' occurs at the same point 320 of timeline 305.

Referring to timeline 310 shown in FIG. 3B, a non-transactional write (or a regular write) action to update C to C'' is received at point 325, after the transactional write action to update C to C' is received at point 320. Depending on the contents of the pending slot for data item C, the non-transactional write action 325 that arrives later in time than the transactional write action 320 can be executed before the transactional write action 320. This out of order or asynchronous execution means that the non-transactional write does not need to wait for the pending transaction to be resolved to take effect.

Timeline 340 shows an example scenario where there is no pending slot for data item C. In this example, the first read (or other pending slot resolving event) may have occurred at some point between 320 and 325. For example, on the first read, the pending slot may have been deleted after applying or rejecting the update. Thus, at point 330a, the data item C is updated to C''. When a read request to access data item C occurs at 335a, the updated data item C'' is returned in response.

Timeline 345 shows an alternative example scenario where there is a pending slot for data item C and the transaction status for the pending slot may indicate a failed or committed status. In either case, the update in the pending slot is applied to the data item C to get a new data item C''' and the pending slot is deleted. When a read request to access data item C arrives at 335b, the new data item C''' having the updated value is returned in response.

Timeline 350 shows an alternative example scenario where there is a pending slot for data item C and the transaction status for the pending slot indicates a pending status. In this scenario, the data item C is updated to C'', and the pending slot for the data item C is retained. When a read request to read data item C arrives at 335c, the pending slot is read to determine the transaction status associated with the transactional write request that occurred at 320. Assuming that the transaction status has been updated from pending to completed, the update in the pending slot can be applied to data item C'' to obtain C'. Thus, the new data item C' is provided as a response to the read request. In this scenario, the value of the data item changed to C'' first and then to C', indicating that the non-transaction write action was asynchronously executed.

Figure 4:
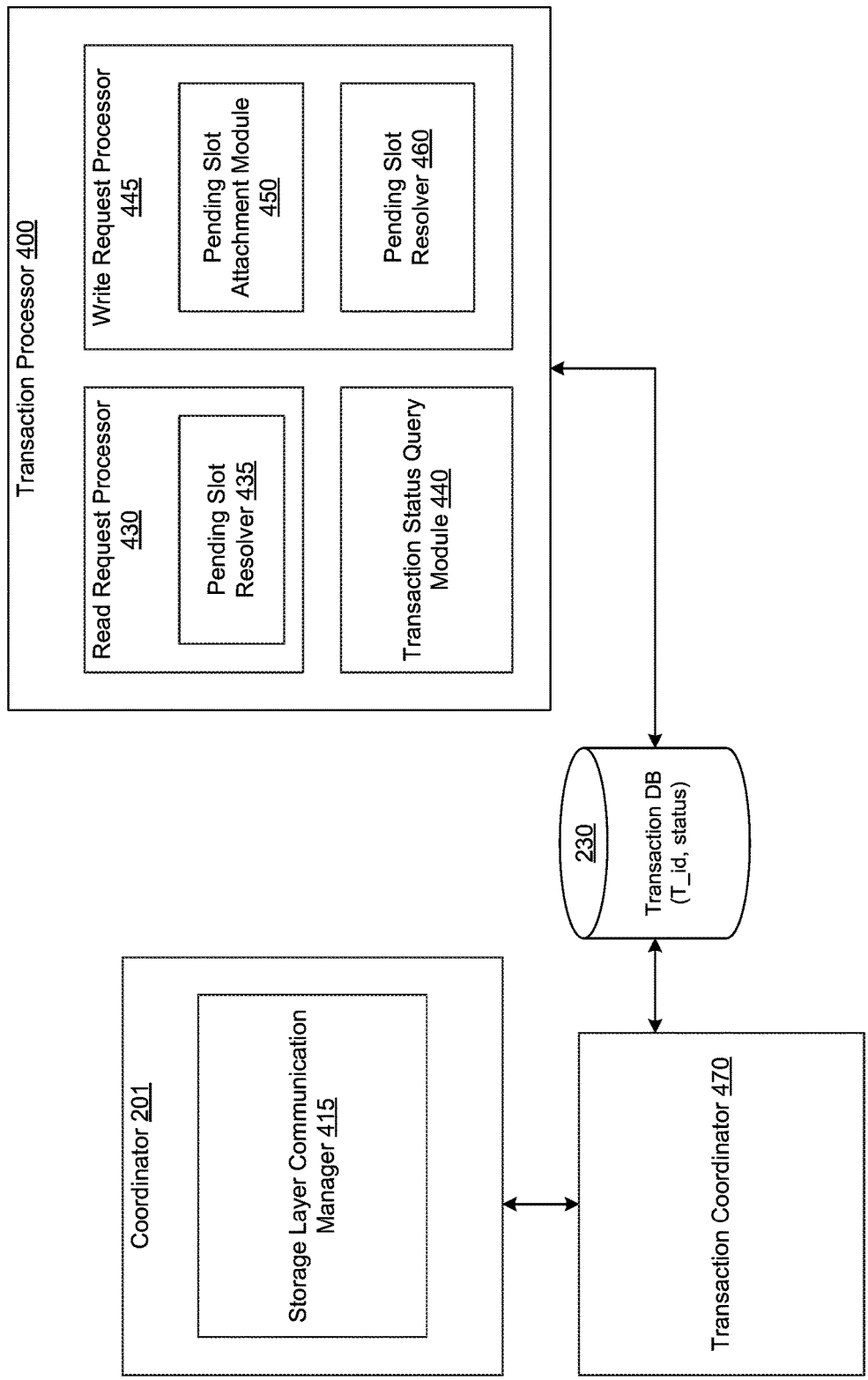
FIG. 4 is a block diagram illustrating example components of a coordinator, a transaction coordinator and a transaction processor that facilitate implementation of a multi-shard commit protocol in the multi-shard database system.

Various components operating in multi-shard database environment that facilitate the implementation of the multi-shard commit protocol will now be described in reference to FIG. 4.

The coordinator 201 is a process or service implemented on a client computing system. The client coordinator 405 can include a storage layer communication manager 415, among other components.

The storage layer communication manager 415 receives client queries such as read/write requests directed to different shards and coordinates their execution according to the multi-shard commit protocol. In some embodiments, the storage layer communication manager 415 triggers the relevant database servers (e.g., by initiating remote procedure calls (RPC calls)) to initiate the read/write operations on data items stored on the different shards. The storage layer communication manager 415 can also communicate with the transaction database 230 to request creation of a new transaction record for transactions. In some embodiments, results of the read/write operations are passed on to the storage layer communication manager 415 for further evaluation. For example, results (e.g., true, false or no response) from write operations of a transaction on different shards are received by the storage layer communication manager 415 and used to manage (e.g., update or no change) the status of the transaction in the transaction database 230.

The transaction coordinator 470, in some embodiments, coordinates the parallel execution of a transaction on different shards. The transaction coordinator 470 instructs the relevant database servers to prepare to execute the actions included in the transaction. In response, transaction processors (e.g., transaction processor 400) local to the database servers perform the initial write operations. The transaction coordinator 470 can also receive indication of success or failure of write operations from all the database servers involved in the transaction and relay the information to the coordinator 201.

The transaction processor 400 is implemented on a database server and is responsible for one or more shards and can perform the actual read/write operation on data items stored on those shards when instructed. In some embodiments, the transaction processor 400 can include a read request processor 430, a write request processor 445 and a transaction status query module 440.

The write request processor 445 processes transactional write requests and non-transactional write requests from clients. When a transactional write request is received, the write request processor 445 starts executing the initial write operation. The write request processor 445 can also communicate the status of the write operation to the transaction coordinator 470. When a transaction write request is received, the pending slot attachment module 450 attaches or associates a pending slot to a data item associated with the transactional write request. The pending slot data structure includes a transaction identifier pointing to a transaction record in the transaction database and a new data or update to be applied to the data item.

In some embodiments, the write request processor 445 can also receive a non-transactional write request. Before executing the non-transactional write request, the pending slot resolver 460 checks whether the data item associated with the non-transactional write has a pending slot. If there is no pending slot, the non-transactional write is executed normally, without having to incur the expense of querying the transaction database 230. If there is a pending slot, the pending slot resolver 460 performs a check on the status of the transaction using the transaction identifier included in the pending slot. The transaction status information is used by the pending slot resolver 460 to resolve the state of the pending slot and determine whether the non-transactional write request can be asynchronously executed. For example, a completed or failed transaction status for the pending slot indicates that the non-transactional write arrived later in time than the transactional write and the new data in the pending slot would have been discarded based on the transaction status on the first read in any case. In this instance, the pending slot resolver 460 can safely delete the pending slot without applying whatever new data is in the pending slot. Instead the new data from the non-transactional write can be applied to the data item.

A pending transaction status for the pending slot, on the other hand, indicates that the transactional write arrived earlier in time than the non-transactional write and may be executed at a later time. Instead of waiting for the pending transaction status to change from pending to completed or failed, the pending slot resolver 460 can execute the non-transactional write out of order by applying the new data from the non-transactional write to the data item. If the transaction status gets resolved later on, the new data in the pending slot can be applied to the data item.

The transaction processor 400 also includes a read request processor 430. The read request processor performs read/retrieval operations on data items stored on one or more shards managed by the database server. In some embodiments, the read request processor 430 includes a pending slot resolver 435 that checks for the presence of a pending slot associated with a data item and evaluate the status of a transaction associated with the pending slot. Based on the evaluation of the pending slot, the pending slot resolver 345 can determine whether to apply a new data included in the data structure to the data item. In some embodiments, to evaluate the pending slot, the pending slot resolver 435 utilizes the transaction status query module 440 to retrieve a transaction status for the transaction. Based on the evaluation, the read request processor 430 can return the new data or the old data as a response to the read request.

Figure 5:
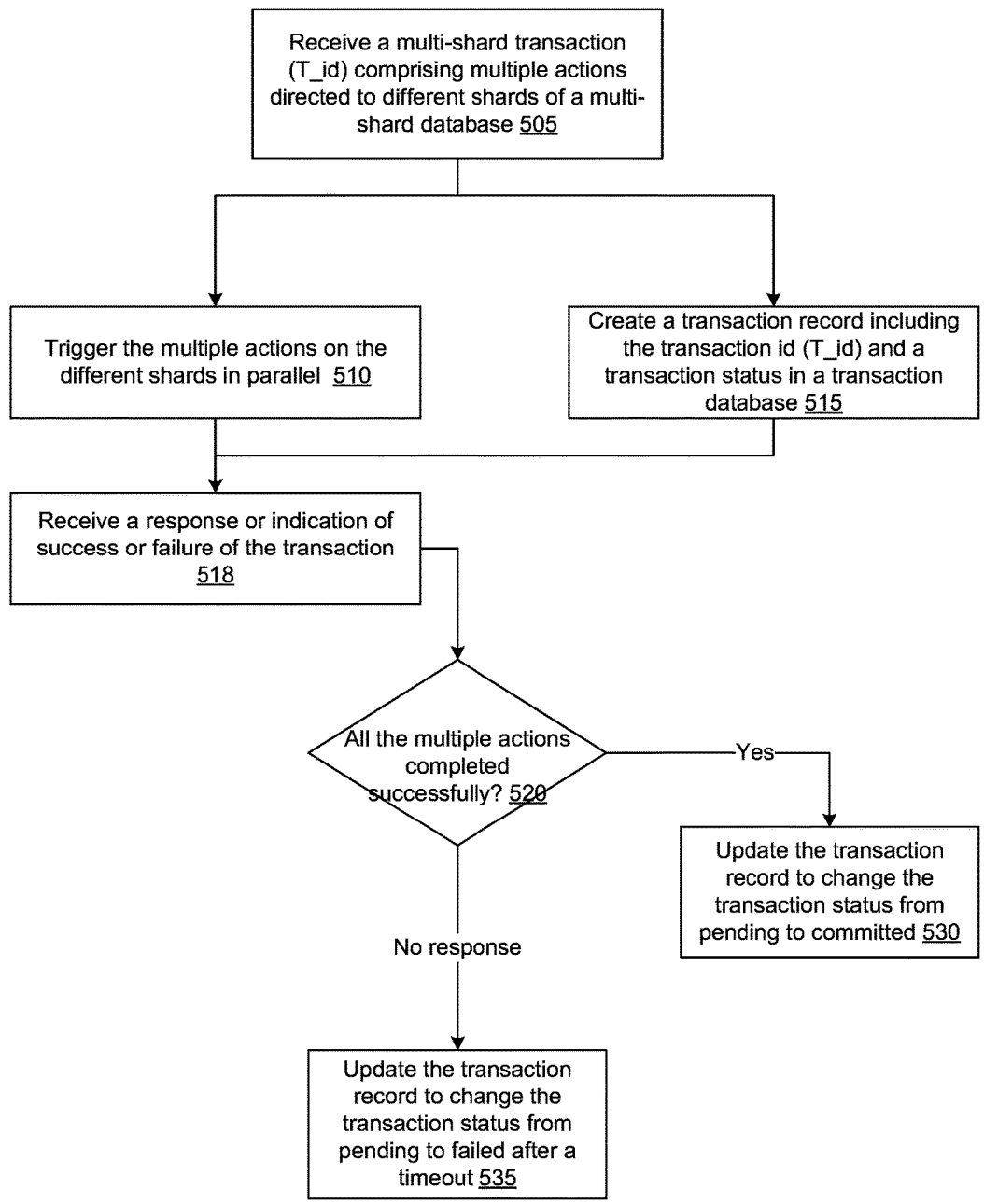
FIG. 5 is a logic flow diagram illustrating an example method of executing in parallel actions of a transaction in the multi-shard database system.
Figure 6:
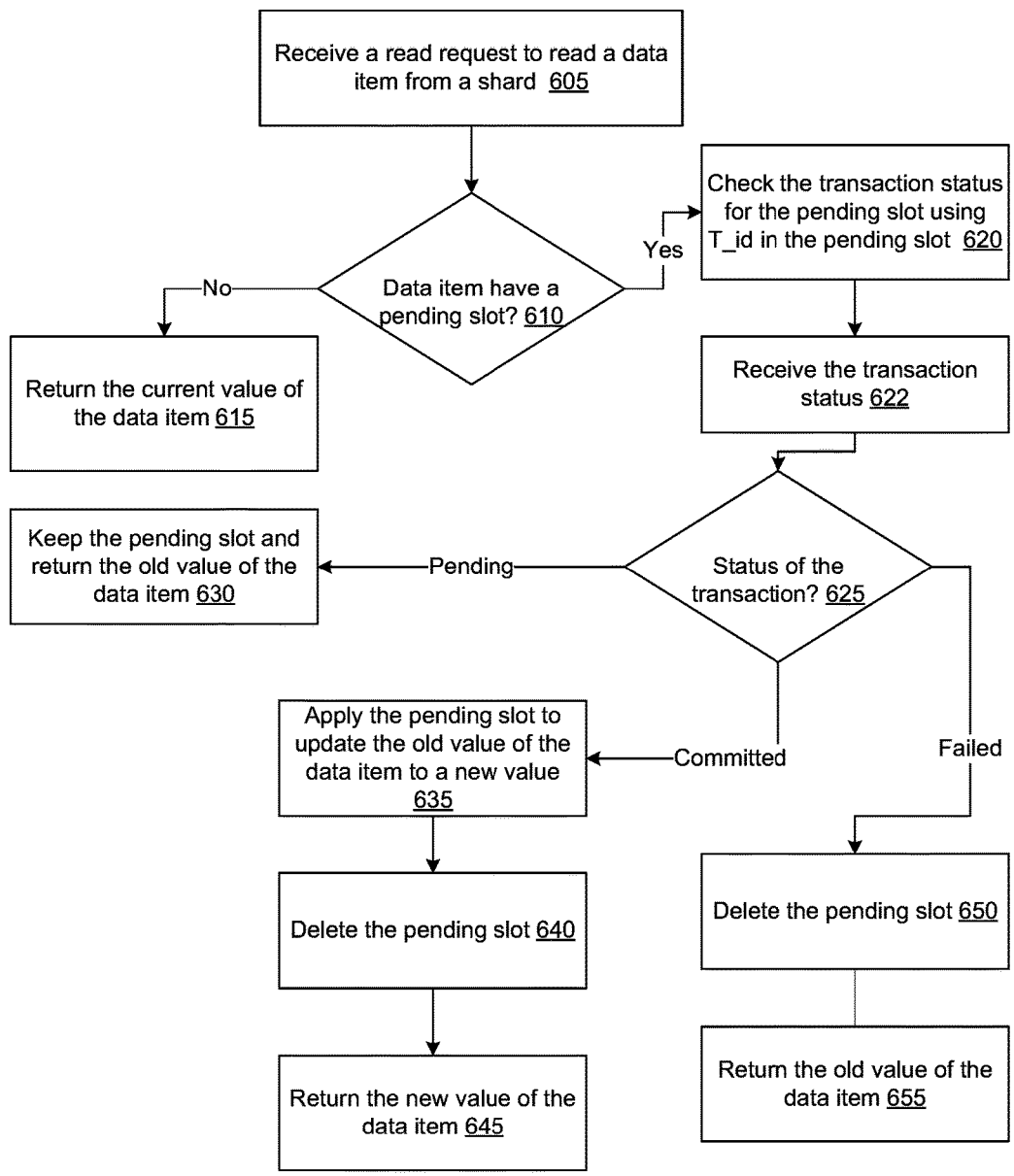
FIG. 6 is a logic flow diagram illustrating an example method of resolving a prior write action in response to a read transaction in the multi-shard database system.
Figure 7:
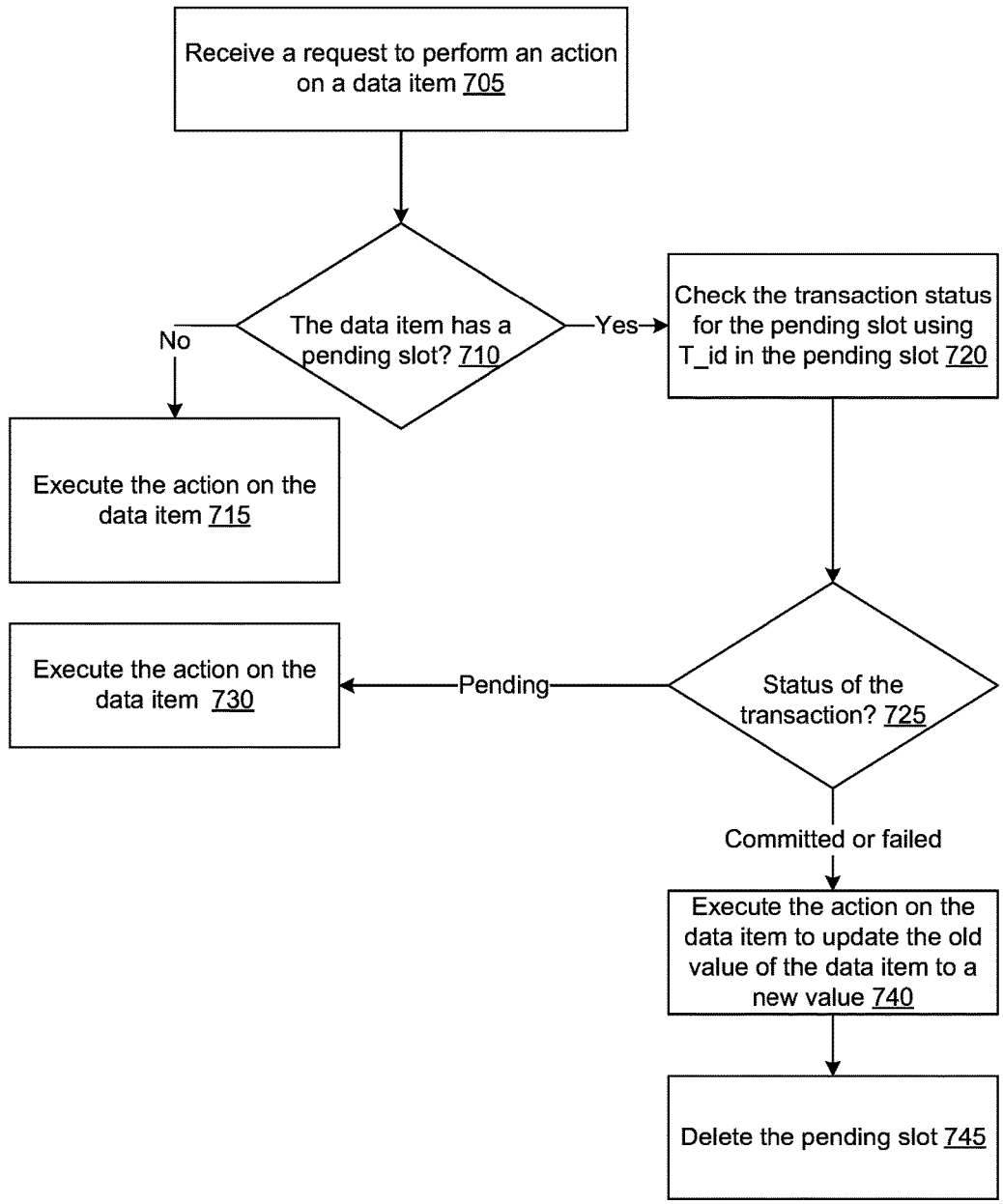
FIG. 7 is a logic flow diagram illustrating an example method of asynchronously executing a regular write transaction in the multi-shard database system.

FIGS. 5-7 illustrate logic flow diagrams for example methods of processing transactions and other read/write operations using the multi-shard commit protocol to implement eventual consistency.

Referring to FIG. 5, a logic flow diagram illustrating an example method 500 for coordinating the execution of a multi-shard transaction is shown. At block 505, a coordinator (e.g., coordinator 201 of FIGS. 2A, 2B and 4) receives a multi-shard write transaction including multiple writes directed to different shards of the multi-shard database system, where the data objects on which the writes are to be executed are stored. The coordinator can also assign the multi-shard transaction a transaction id and request creation of a transaction record using the transaction id on a transaction database (e.g., transaction database 230) at block 515. The transaction record will initially have a pending state as transaction status.

At block 510, the coordinator triggers the multiple writes on the different shards in parallel (e.g., by making RPC calls). The shard ids embedded in the data items associated with the multi-shard transaction along with a shard mapping directory may be used to identify the different shards to which the multiple writes should be directed.

At block 518, the coordinator may receive an indication of success or failure of the multiple writes. In some embodiments, the coordinator can receive an indication from each of the database servers hosting the different shards whether the write was successful. Alternately, a transaction coordinator (e.g., transaction coordinator 470) can receive the responses from the database servers and relay the response to the coordinator.

In some embodiments, when all the writes are successfully executed, the transaction is deemed to be successfully committed. If there is no response from the database servers hosting the different shards, the transaction cannot be deemed committed. Instead, the transaction may be pending or failed (e.g., due to connection error or database server failure, etc.). At decision block 520, the coordinator determines if the multiple actions are successfully completed. If true, at block 530, the coordinator updates the transaction status in the associated transaction record stored in transaction database 230 to committed. Conversely, if no response is received from even one of the shards, the coordinator can wait for the response for some time. During this time the transaction would remain in the pending status. After sometime, when the request times out, coordinator can record the transaction as failed at block 535 by updating the transaction status in the associated transaction record stored in the transaction database 230 to failed.

The state of the data items associated with the transaction remain unchanged until the transaction status can be verified or resolved. The verification of the transaction status can occur when an event such as an arrival of a read request to read one of the data items occurs. In another embodiment, the verification can be triggered by reduction in the work load on the database server (e.g., less than x reads/second). FIG. 6 shows a logic flow diagram illustrating an example method 600 of resolving a prior write in response to a read request to read a data item in the multi-shard database system.

At block 605, the database server (e.g., database server having the transaction processor 400) receives a read request to read a data item. At decision block 610, the database server determines if the data item has a pending slot. The lack of a pending slot attached to the data item can indicate that the prior write was not a transactional write or that the transaction was resolved. The database server, in this case, can return the current value (and only consistent value) of the data item at block 615. Conversely, if the data item has a pending slot, the database server can use the transaction id included in the pending slot to check the transaction status at block 620. Checking the transaction status can include sending a query including the transaction id to the transaction database 230. At block 622, the database server receives the transaction status as a response to the query.

At decision block 625, if the query response indicates that the transaction status is pending, the database server retains the pending slot and returns the old value of the data item (i.e., the last consistent state) at block 630. If the query response indicates that the transaction is committed, then the database server can apply the pending slot to update the old value of the data item to a new value at block 635. The state of the data item after applying the pending slot is now consistent since all the writes for the transaction were successfully committed. The database server then deletes the pending slot at 640 and returns the new value of the data item in response to the read request at block 645.

In some instances, the transaction status can indicate that the transaction has failed. In that case, the database server can delete the pending slot at block 650, so that the last consistent state of the data item is retained. At block 655, the database server returns the old value of the data item in response to the read request.

In some embodiments, the multi-shard database environment can handle regular writes along with transactional writes, and can execute such regular writes asynchronously. An example method 700 of asynchronously executing a regular write transaction in the multi-shard database environment is shown in FIG. 7.

At block 705, a database server receives a request to perform a write action on a data item. At decision block 710, the database server determines if the data item has a pending slot. If false, the write action can be executed on the data item at block 715 and the data item would go from one valid state to another.

Alternately, if the data item has a pending slot, the database server checks the transaction status for the pending slot using the transaction id included in the pending slot at block 720. At decision block 725, if the status check indicates that the transaction is pending, then the database server executes the write action on the data item at block 730. Doing so, the write action is executed before a transactional write that arrived at a logical time before the write action. This asynchronous execution does away with having to wait for the earlier transaction to be resolved, and allows a regular write transaction to be executed without delay. Moreover, the database server retains the pending slot for the data item in this case, allowing the earlier transactional write to take effect at a later time.

In some embodiments, the transaction status as determined at decision block 725 can indicate that the transaction is failed or committed. In the committed case, the database server can apply the pending slot action to the data item at block 740 before executing the write action on the data item to update the old value of the data item to a new value at block 745. Because the transaction status is resolved, and the data item is in a consistent state, the database server can then delete the pending slot at block 750. In the failed case, as the transaction status is resolved, the pending slot is discarded at block 755 and the database server applies the request to the data item by executing the action on the data item to update the old value of the data item to a new value at block 760. The update, in either the committed case or the failed case, takes the data item from one consistent state to another consistent state.

Figure 9:
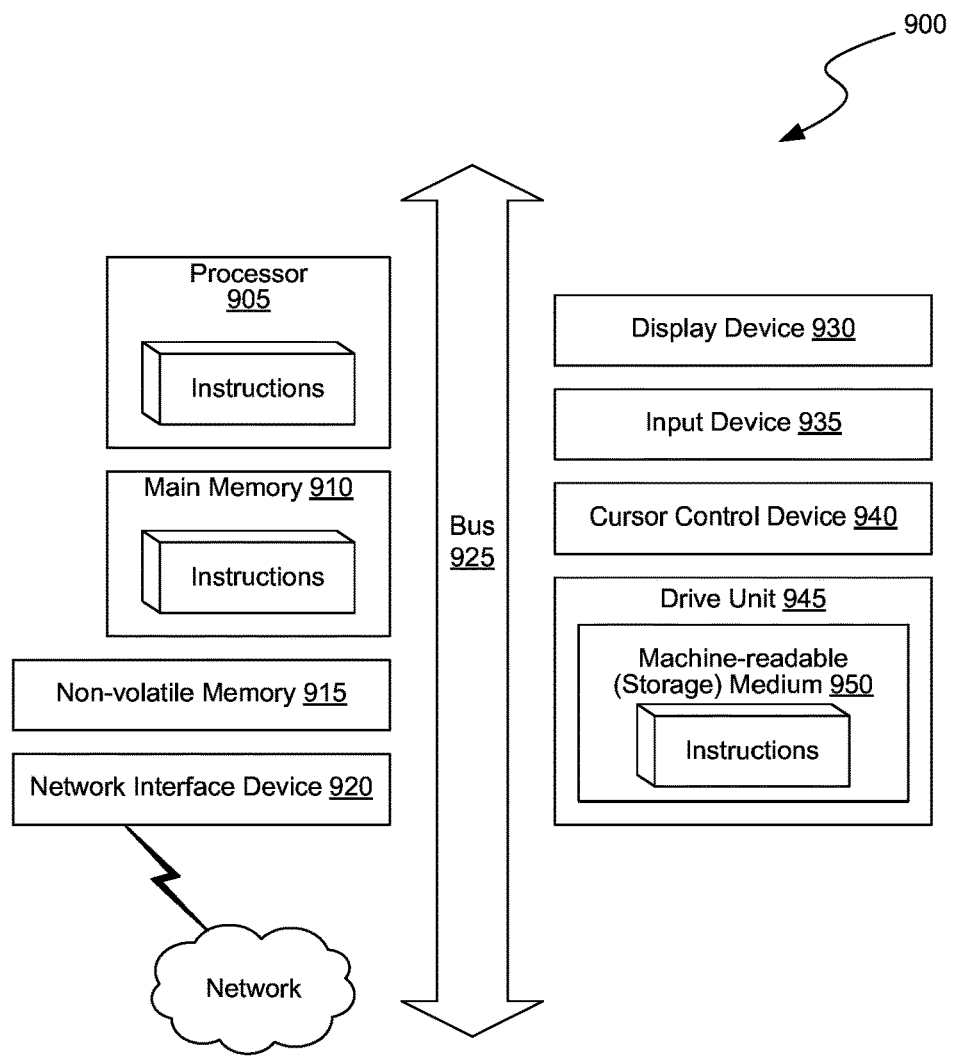
FIG. 9 is a block diagram illustrating a diagrammatic representation of a computer system, e.g., within which a set of instructions for causing the computer system to perform any one or more of the methodologies discussed herein can be executed.

FIG. 9 shows a diagrammatic representation of a computer system 900 on which the embodiments of the present disclosure can be implemented. For example, the client coordinator 201, the transaction processor 400, the transaction coordinator 470 and database servers can be implemented on the computer system 900.

The computer system 900 generally includes a processor 905, main memory 910, non-volatile memory 915, and a network interface device 920. Various common components (e.g., cache memory) are omitted for illustrative simplicity. The computer system 900 is intended to illustrate a hardware device on which any of the components depicted in the example of FIGS. 1, 2A, 2B and 4 (and any other components described in this specification) and methods described in the example of FIGS. 5-7 can be implemented The computer system 900 be of any applicable known or convenient type. The components of the computer system 900 can be coupled together via a bus 925 or through some other known or convenient device.

The processor 905 may be, for example, a conventional microprocessor such as an Intel Pentium microprocessor or Motorola power PC microprocessor. One of skill in the relevant art will recognize that the terms "computer system-readable (storage) medium" or "computer-readable (storage) medium" include any type of device that is accessible by the processor.

The memory 910 is coupled to the processor 905 by, for example, a bus 925 such as a PCI bus, SCSI bus, or the like. The memory 910 can include, by way of example but not limitation, random access memory (RAM), such as dynamic RAM (DRAM) and static RAM (SRAM). The memory 910 can be local, remote, or distributed.

The bus 925 also couples the processor 905 to the non-volatile memory 915 and drive unit. The non-volatile memory 915 is often a magnetic floppy or hard disk, a magnetic-optical disk, an optical disk, a read-only memory (ROM), such as a CD-ROM, EPROM, or EEPROM, a magnetic or optical card, SD card, or another form of storage for large amounts of data. Some of this data is often written, by a direct memory access process, into memory during execution of software in the computer system 900. The non-volatile memory 915 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 915 and/or the drive unit 945. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 910 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 925 also couples the processor to the network interface device 920. The interface can include one or more of a modem or network interface. It will be appreciated that a modem or network interface can be considered to be part of the computer system 900. The interface can include an analog modem, isdn modem, cable modem, token ring interface, satellite transmission interface (e.g., "direct PC"), or other interfaces for coupling a computer system to other computer systems. The interface can include one or more input and/or output devices 935. The I/O devices can include, by way of example but not limitation, a keyboard, a mouse or other pointing device, disk drives, printers, a scanner, speaker, DVD/CD-ROM drives, disk drives, and other input and/or output devices, including a display device. The display device 930 can include, by way of example but not limitation, a cathode ray tube (CRT), liquid crystal display (LCD), LED display, a projected display (such as a heads-up display device), a touchscreen or some other applicable known or convenient display device. The display device 930 can be used to display text and graphics. For simplicity, it is assumed that controllers of any devices not depicted in the example of FIG. 8 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 915 and/or drive unit 945 and causes the processor to execute the various acts required by the operating system to input and output data and to store data in the memory, including storing files on the non-volatile memory 915 and/or drive unit 945.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the computer system operates as a standalone device or may be connected (e.g., networked) to other computer systems. In a networked deployment, the computer system may operate in the capacity of a server or a client computer system in a client-server network environment, or as a peer computer system in a peer-to-peer (or distributed) network environment.

The computer system may be a server computer (e.g., a database server), a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any computer system capable of executing a set of instructions (sequential or otherwise) that specify actions to be taken by that computer system.

While the computer system-readable medium or computer system-readable storage medium 950 is shown in an exemplary embodiment to be a single medium, the term "computer system-readable medium" and "computer system-readable storage medium" should be taken to include a single medium or multiple media (e.g., a centralized or distributed database, and/or associated caches and servers) that store the one or more sets of instructions. The term "computer system-readable medium" and "computer system-readable storage medium" shall also be taken to include any medium that is capable of storing, encoding or carrying a set of instructions for execution by the computer system and that cause the computer system to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of computer system or computer-readable media used to actually effect the distribution.

Further examples of computer system-readable storage media, computer system-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments not limited except as by the appended claims.

We claim:

1. A computer-implemented method, comprising:
   receiving a write transaction including multiple writes directed to different shards of a data storage system, wherein each one of the multiple writes is associated with a distinct data item stored at one of the different shards and comprises a pending value to update a current value of the distinct data item;
   creating, at a transaction database, a transaction record for the write transaction, the transaction record comprising a transaction identifier and a transaction status;
   executing, in parallel, each one of the multiple writes by:
      generating, for the distinct data item associated with the one of the multiple writes while retaining the current value of the distinct data item, a data structure that includes:
         the transaction identifier; and
         the pending value of the distinct data item;
   receiving a first request to read a specified data item involved in the write transaction;
   at the one of the different shards storing the specified data item and:
      in response to the data structure of the specified data item including the pending value:
         using the transaction identifier included in the data structure to query the transaction database for the transaction status; and
         in response to the transaction status being pending, returning the current value of the specified data item in response to the first request;
   updating the transaction status in the transaction record for the write transaction from pending to completed when each of the multiple writes is successfully executed on the corresponding shard;
   receiving a second request to read the specified data item;
   at the one of the different shards and in response to the data structure of the specified data item including the pending value:
      using the transaction identifier included in the data structure to query the transaction database for the transaction status; and
      in response to the transaction status being committed:
         updating the current value of the specified data item to the pending value;
         deleting the pending value; and
         returning the current value in response to the second request;
   receiving a third request to read the specified data item; and
   at the one of the different shards and in response to the data structure of the specified data item no longer including the pending value, returning the current value of the specified data item in response to the third request.

2. The computer-implemented method of claim 1 further comprising:
   updating an additional transaction status in an additional transaction record of an additional write transaction including multiple additional writes from pending to failed when at least one of the multiple additional writes fails or when no indication relating to the successful execution of each of the multiple additional writes is received within a defined period of time.

3. The computer-implemented method of claim 1 further comprising:
   in response to a request to perform an action on an additional specified data item involved in the write transaction, evaluating the data structure associated with the additional specified data item; and
   based on the evaluating, determining whether to update the current value of the additional specified data item with the pending value of the additional specified data item before performing the action on the additional specified data item.

4. The computer-implemented method of claim 3, wherein the action includes a write action.

5. The computer-implemented method of claim 1 further comprising, when the load on the data storage system is below a specified value and when the transaction status is committed:
updating the current value of at least one of the data items involved in the write transaction to the pending value of the at least one of the data items; and
deleting the pending value of the at least one of the data items.

6. The computer-implemented method of claim 1, wherein an additional transaction status in an additional transaction record of an additional write transaction including multiple additional writes is one of pending, completed or failed.

7. The computer-implemented method of claim 6 further comprising:
if the additional transaction status is pending,
retaining the data structure of at least one of the data items involved in the additional write transaction for reevaluation without applying the pending value of the at least one of the data items to the current value of the at least one of the data items.

8. The computer-implemented method of claim 6 further comprising:
if the additional transaction status is completed,
applying the pending value of at least one of the data items involved in the additional write transaction to update the current value of the at least one of the data items; and
deleting the data structure associated with the at least one of the data items.

9. The computer-implemented method of claim 6 further comprising:
if the additional transaction status is failed,
deleting the data structure associated with at least one of the data items involved in the additional write transaction without applying the pending value of the at least one of the data items to the current value of the at least one of the data items.

10. The computer-implemented method of claim 1 further comprising:
receiving a write request to write a second value to an additional specified data item involved in the write transaction, wherein the write request is received at a logical time later than the write transaction;
regardless of the transaction status of the write transaction, executing the write request asynchronously such that the second value is used to update the current value of the additional specified data item.

11. The computer-implemented method of claim 10 further comprising
deleting the data structure associated with the specified data item when the transaction status is completed.

12. A system, comprising: a coordinator configured to:
receive a write transaction including multiple writes directed to different database shards, wherein each one of the multiple writes is associated with a distinct data item at one of the different database shards and comprises a pending value for updating a current value of the distinct data item; and
initiate, in parallel, execution of each one of the multiple writes associated with the write transaction on the different database shards;
a transaction database configured to store a transaction record for the write transaction, the transaction record including a transaction identifier and a transaction status; and
multiple database servers, each of the multiple database servers configured to:
host one of the different database shards;
receive one of the multiple writes;
associate a data structure with the distinct data item associated with the one of the multiple writes, wherein the data structure includes the transaction identifier pointing to the transaction record in the transaction database and the pending value for updating the current value of the distinct data item; and
process a first request to read the distinct data item by:
in response to the data structure of the distinct data item including the pending value:
using the transaction identifier included in the data structure to query the transaction database for the transaction status; and
in response to the transaction status being pending, returning the current value of the distinct data item in response to the first request;
process a second request to read the distinct data item by:
in response to the data structure of the distinct data item including the pending value:
using the transaction identifier included in the data structure to query the transaction database for the transaction status; and
in response to the transaction status being committed:
updating the current value of the distinct data item to the pending value;
deleting the pending value; and
returning the current value in response to the second request; and
process a third request to read the distinct data item by:
in response to the data structure of the distinct data item no longer including the pending value, returning the current value of the distinct data item.

13. The system of claim 12, wherein the coordinator is further configured to:
update the transaction status in the transaction record for the write transaction from pending to completed in response to receiving an indication that each of the multiple writes was successfully executed on the different database shards.

14. The system of claim 13, wherein each of the multiple database servers is further configured to:
evaluate the data structure associated with at least one distinct data item involved in the one of the multiple writes in response to receiving a request to perform an action on the at least one distinct data item; and
determine, based on the evaluation, whether to update the current value of the at least one distinct data item to the pending value of the at least one distinct data item before performing the action on the current value.

15. The system of claim 14, wherein the action includes a write action.

16. The system of claim 14, wherein each of the multiple database servers is further configured to evaluate the data structure by retrieving the transaction status for the write transaction based on the transaction identifier included in the data structure associated with the at least one distinct data item.

17. The system of claim 16, wherein each of the multiple database servers is configured to:
    retain the data structure of the at least one distinct data item for reevaluation without applying the pending value of the at least one distinct data item to the current value of at least one distinct data item when the transaction status is pending;
    apply the pending value to the at least one distinct data item and delete the data structure associated with the at least one distinct data item when the transaction status is completed; and
    delete the data structure associated with the at least one distinct data item without applying the pending value to the current value of the at least one distinct data item when the transaction status is failed.

18. A computer-readable memory device storing computer-readable instructions, comprising:
    instructions for receiving a first read request, a second read request, and a third read request to read a data item from a shard of multiple shards, the data item having a current value;
    instructions for determining if the data item is associated with a data structure having a pending value;
    instructions for responding to the first request comprising:
        instructions for retrieving a transaction identifier from the data structure;
        instructions for using the transaction identifier to query a transaction database for a transaction status in a transaction record corresponding to the transaction identifier; and
        instructions for returning, in an event the transaction status is pending, the current value of the data item;
    instructions for responding to the second request comprising:
        instructions for retrieving the transaction identifier from the data structure;
        instructions for using the transaction identifier to query the transaction database for the transaction status; and
        instructions for applying, in an event the transaction status is completed, the pending value in the data structure to the data item as the current value of the data item; and
        instructions for returning the current value of the data item;
    instructions for responding to the third request comprising instructions for returning, in an event the data item is not associated with the data structure, the current value of the data item.

19. The computer-readable memory device of claim 18, wherein the instructions for determining if the data item is associated with the data structure having the pending value include:
    instructions for determining that the data item is not associated with the data structure.

20. The computer-readable memory device of claim 18, wherein the data structure is one of multiple data structures generated in response to receiving a write transaction including multiple writes directed to the multiple shards, wherein each one of the multiple writes is associated with a different data item at the multiple shards.

* * * * *